United States Patent
Kapur et al.

(10) Patent No.: US 6,835,335 B2
(45) Date of Patent: Dec. 28, 2004

(54) PROCESS FOR CRYSTALLIZING AT LEAST A PORTION OF A CRYSTALLIZABLE CONDENSATION HOMOPOLYMER TO FORM SOLID PARTICLES

(75) Inventors: Vivek Kapur, Kennett Square, PA (US); Govindasamy Paramasivan Rajendran, Boothwyn, PA (US); Kenneth Wayne Leffew, Kennett Square, PA (US)

(73) Assignee: Invista North America S.á.r.l., Wilmington, DE (US)

( * ) Notice: Subject to any disclaimer, the term of this patent is extended or adjusted under 35 U.S.C. 154(b) by 313 days.

(21) Appl. No.: 10/150,234

(22) Filed: May 17, 2002

(65) Prior Publication Data

US 2003/0222363 A1 Dec. 4, 2003

(51) Int. Cl.[7] ................................................ B29B 9/10
(52) U.S. Cl. ............................................... 264/5; 264/8
(58) Field of Search ............................ 264/5, 8, 9, 11, 264/12, 13, 14

(56) References Cited

U.S. PATENT DOCUMENTS

| | | | |
|---|---|---|---|
| 4,403,090 A | 9/1983 | Smith | |
| 4,643,925 A | 2/1987 | Smith et al. | |
| 5,010,146 A | 4/1991 | Kohsaka et al. | |
| 5,510,454 A | 4/1996 | Dtouffer et al. | |
| 5,540,868 A | 7/1996 | Stouffer et al. | |
| 5,633,018 A | 5/1997 | Stouffer et al. | |
| 5,714,262 A | 2/1998 | Stouffer et al. | |
| 5,730,913 A | 3/1998 | Stouffer et al. | |
| 6,150,454 A | 11/2000 | Wu et al. | |

FOREIGN PATENT DOCUMENTS

| | | |
|---|---|---|
| JP | 10-279784 | 10/1998 |
| JP | 11-322968 | 11/1999 |

*Primary Examiner*—Mary Lynn Theisen

(57) ABSTRACT

A process for forming solid particles comprising the steps of: combining in molten form a major component of a crystallizable condensation homopolymer and a minor component of a non-crystallizable condensation polymer, wherein the crystallizable condensation homopolymer and the non-crystallizable condensation polymer each have a degree of polymerization of 10 to less than 48 prior to the combining; mixing the combined crystallizable condensation homopolymer and non-crystallizable condensation polymer in molten form to form a mixture that comprises 10 to 30 mol % of the non-crystallizable condensation polymer; forming the mixture into droplets; exposing the droplets to a thermal environment which results in the bulk of the droplet reaching within 15 seconds a temperature within ±10° C. of the temperature at which the maximum rate of crystallization of the crystallizable condensation homopolymer occurs; and crystallizing at least a portion of the crystallizable condensation homopolymer in the mixture to form solid particles.

13 Claims, 6 Drawing Sheets

PROCESS FOR CRYSTALLIZING AT LEAST A PORTION OF A CRYSTALLIZABLE CONDENSATION HOMOPOLYMER TO FORM SOLID PARTICLES

FIELD OF THE INVENTION

This invention relates to a process for forming solid particles. More specifically, the invention is directed to solid particles formed from a mixture of a crystallizable condensation homopolymer and a non-crystallizable condensation polymer, wherein at least of portion of the crystallizable condensation homopolymer of the solid particle is crystallized.

BACKGROUND OF THE INVENTION

Polyethylene terephthalate (PET) is widely employed commercially in the fabrication of containers for liquids such as carbonated beverages. PET provides high strength and modulus with excellent toughness, thought to derive largely from its relatively high level of crystallinity, and the self-reinforcement achieved when it undergoes orientation in the blow molding process which is highly preferred for fabricating containers and to which PET is especially well-suited. However, in certain emerging market areas there is a need for improvements in the permeability of PET to carbon dioxide and oxygen. One such market area is that of carbonated beverage bottles smaller than one liter where the relatively large surface to volume ratio places greater demands on $CO_2$ barrier properties. Another such market area is that of beer bottles where even a small amount of oxygen contamination will degrade the taste of the beer.

It has long been recognized in the art that polyethylene isophthalate (PEI), an amorphous polymer, provides considerable improvement in barrier properties over PET. However, because of its amorphous structure, PEI homopolymer has been found to be completely unsuited for use in container fabrication.

Among the improvements which have been disclosed in recent years is the incorporation of varying amounts of PEI into PET resins. The resulting PEI/PET resins have been found to have improved barrier properties over that of PET containers and, thus, have led to increases in the shelf life of many products. For oriented shaped articles requiring a longer shelf life, PEI has been used as a barrier layer in a multi-layer container or as a blend with PET in single-walled containers.

U.S. Pat. No. 4,403,090 to Smith discloses a method for making block copolyesters by separately forming isophthalic and non-isophthalic polyesters, melt blending the polyesters, and then polymerizing the melt blend in the solid state. Though detailed solid state polymerization conditions are provided, no specific methods beyond the foregoing are disclosed for making the block copolymers.

U.S. Pat. No. 4,643,925 to Smith et al. discloses a high molecular weight polyester resin prepared by solid state polymerizing a melt blend of PET and PEI homopolymers. Prepolymers of the component polymers having an inherent intrinsic viscosity (IV) of at least 0.3 dl/g are first melt blended, solidified into pellets or chips, crystallized, and then solid state polymerized at about 5° C. to 20° C. below the sticking temperature of the pellets.

U.S. Pat. No. 6,150,454 to Wu et al. discloses a copolyester composition made from a random copolymer of isophthalic and terephthalic acids, a nucleating agent, and a chain-branching agent. It is stated that the chain-branching agent is added to reduce the natural stretch ratio of the copolymer resins to about the stretch ratio levels of commercially available PET resins. The copolymers in Wu et al. are produced by combining the acids, glycols, branching agents, and nucleating agents in the melt and polymerizing to form the branched, random copolymers of patentees invention. Wu et al.'s disclosure is limited to up to 10% of IPA comonomer. It is well known in the art that the mechanical integrity of containers made of random TA/IA copolymers deteriorate rapidly with increasing amounts of the IA moiety above 10%.

The Japan Patent Application Publications H10-279784 and H11-322968 to Kawano disclose improved barrier properties using block copolymers formed from PEI and PET moieties. Kawano discloses melt blending PET with a copolymer of PET and PEI containing about 80% PEI to form block copolymers having up to 30% PEI.

U.S. Pat. Nos. 5,510,454, 5,540,868, 5,633,018, 5,714,262, and 5,730,913, hereby incorporated by reference, teach a method to make solid particles from a condensation polymer by a thermal shock crystallization process and subsequent polymerization of the crystallized polymer particles in the solid state to make high molecular weight polymer. In a process termed "thermal shock crystallization" low molecular weight molten polymer droplets are deposited on a moving surface at a temperature corresponding to the maximum crystallization rate of the low molecular weight polymer, resulting in generation of crystals in an environment that highly favors crystal growth over nucleation which, in turn, results, in some cases, in unique crystalline morphology. The resulting low molecular weight polymer particles display an unusually high melting point thereby permitting solid state polymerization to be effected at higher temperatures than is possible using crystalline particles produced from conventional processes.

Because of the necessity to preserve the very high rates of crystallization required in the thermal shock crystallization process, the disclosures of U.S. Pat. Nos. 5,510,454, 5,540,868, 5,633,018, 5,714,262, and 5,730,913, are limited to copolymers having no more than 10 mol % of a comonomer.

James et al., *Macromol. Chem. Phys.* 2001, 202, no. 11, pp. 2267–2274 discloses an adaptation of the process of U.S. Pat. Nos. 5,510,454, 5,540,868, 5,633,018, 5,714,262, and 5,730,913 to form block copolymers from two crystalline oligomers, PET and polyethylene-2,6-naphthalate (PEN), having up to a 50/50 blend thereof.

U.S. Pat. No. 5,010,146 to Kohsaka et al. discloses random copolymers of a crystalline oligomer and an amorphous oligomer, PET and polycarbonate, formed by combining the oligomers in the melt followed by polymerization in the melt phase.

Not taught in the art is the feasibility of producing block copolymers of a crystalline oligomer and an amorphous oligomer having more than 10 mol % of the amorphous oligomer utilizing the method of U.S. Pat. Nos. 5,510,454, 5,540,868, 5,633,018, 5,714,262, and 5,730,913. In particular, not taught in the art is the preparation of a high molecular weight block copolymer of PET with greater than 10 mol % PEI employing the advantageous methods of thermal shock crystallization.

SUMMARY OF THE INVENTION

The present invention provides a process for forming solid particles. The process comprises the steps of: a) combining in molten form a major component of a crystallizable condensation homopolymer and a minor component of a non-crystallizable condensation polymer, wherein the crystallizable condensation homopolymer and the non-crystallizable condensation polymer each have a degree of polymerization of 2 to less than 48 prior to the combining; b) mixing the combined crystallizable condensation homopolymer and non-crystallizable condensation polymer in molten form to form a mixture that comprises 10 to 30 mol % of the non-crystallizable condensation polymer; c) forming the mixture into droplets; exposing the droplets to a thermal environment which results in the bulk of the droplet reaching within 15 seconds a temperature within ±10° C. of the temperature at which the maximum rate of crystallization of the crystallizable condensation homopolymer occurs; and d) crystallizing at least a portion of the crystallizable condensation homopolymer in the mixture to form solid particles.

In one embodiment of the invention, the mixture comprises 15 to 25 mol % of the non-crystallizable condensation polymer.

In another embodiment of the invention, at least one of the crystallizable condensation homopolymer and the non-crystallizable condensation polymer has a degree of polymerization of 15 to 35.

Preferably, the mixture has a blockiness factor of at least 0.8, more preferably at least 0.9, most preferably at least 0.95.

In a preferred embodiment, the crystallizable condensation homopolymer is polyethylene terephthalate and/or the non-crystallizable condensation homopolymer is polyethylene isophthalate.

In one embodiment, the at least one polymer in the minor component of the mixture is not soluble in the major component.

In yet another embodiment, the minor component of the mixture can further comprise up to 20 mol % of one or more additional crystallizable condensation homopolymers or non-crystallizable condensation polymers.

In a further embodiment, the invention further comprises the step of solid state polymerizing the solid particles.

DETAILED DESCRIPTION

Figure 1:
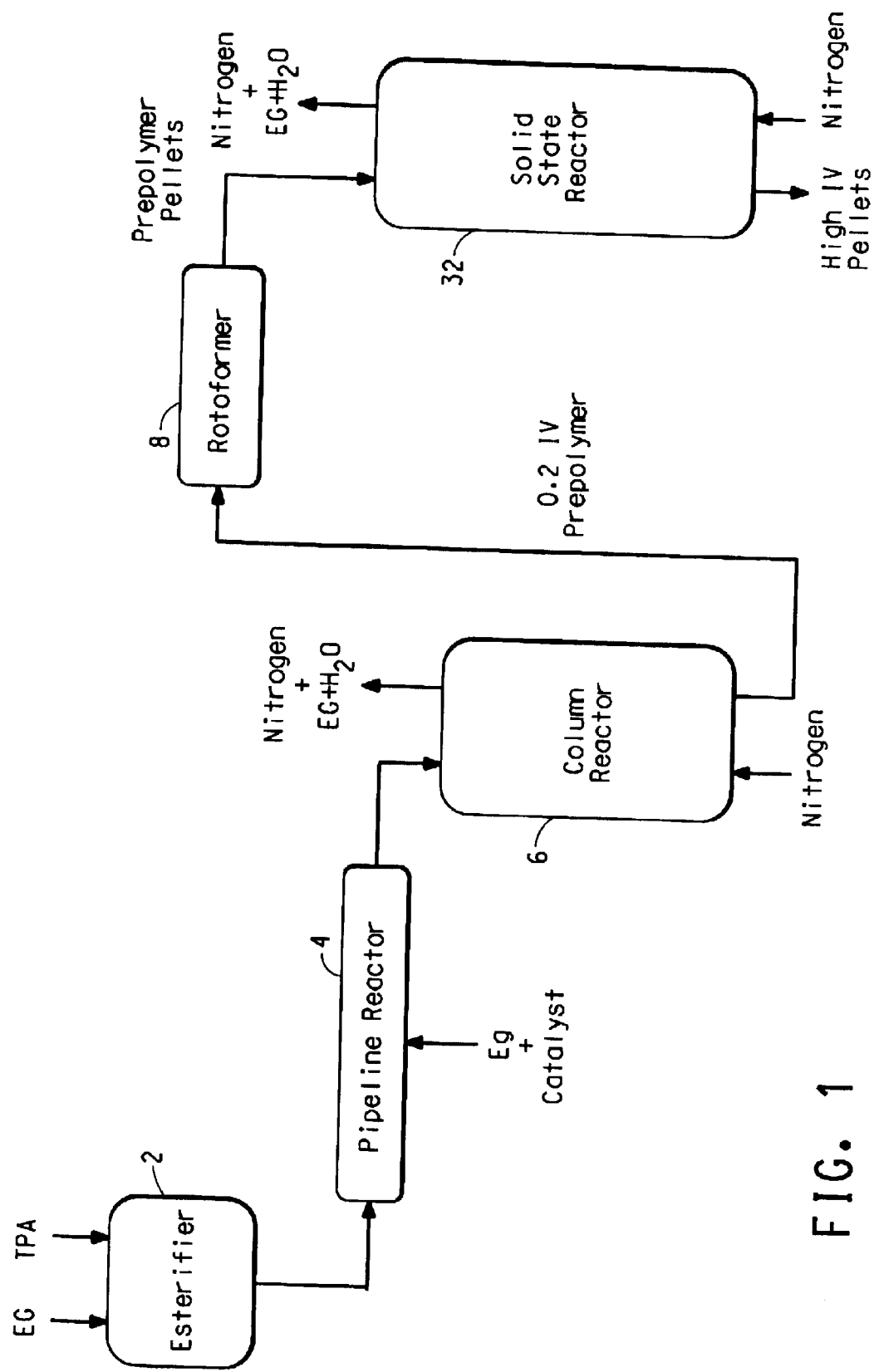
FIG. 1 is a schematic of a known method for producing high molecular weight solid particles from a condensation polymer by thermal shock crystallization.

FIG. 1 schematically illustrates a known method for producing high molecular weight solid particles of PET from a condensation polymer by thermal shock crystallization. Specifically, the precursor components ethylene glycol (EG) and terephthalic acid (TPA) are loaded into an esterifier (2). The esterified product prepared therein is fed to a pipeline reactor (4), wherein EG and a catalyst are also fed. The pipeline reactor product is then fed to a column reactor (6), along with nitrogen, resulting in a 0.2 IV prepolymer which is fed to a rotoformer (8) for shock crystallization to form prepolymer pellets. The column reactor releases nitrogen, EG, and water which are fed to another location (not shown) for removal from the system. The prepolymer pellets are then fed to a solid state reactor (32), along with nitrogen, to solid state polymerize the prepolymer pellets into high IV pellets. The solid state reactor releases nitrogen, EG, and water which are fed to another location (not shown) for removal from the system.

The present invention is a modification of the schematic illustrated in FIG. 1. Specifically, the present invention provides a process for forming solid particles by combining and mixing in molten form a crystallizable condensation homopolymer and a non-crystallizable condensation polymer each having a degree of polymerization of 2 to less than 48, preferably 10 to 40, more preferably 15 to 35, prior to the combining, forming the mixture into droplets, and exposing the droplets to a thermal environment such that at least a portion of the crystallizable condensation homopolymer is crystallized. The major component of the mixture is a crystallizable condensation homopolymer. The mixture also includes 10 mol % to 30 mol %, preferably 15 mol % to 25 mol %, of a non-crystallizable condensation polymer as a minor component. Preferably, the solid particles formed according to the process of the invention are crystalline block copolymers.

Figure 2:
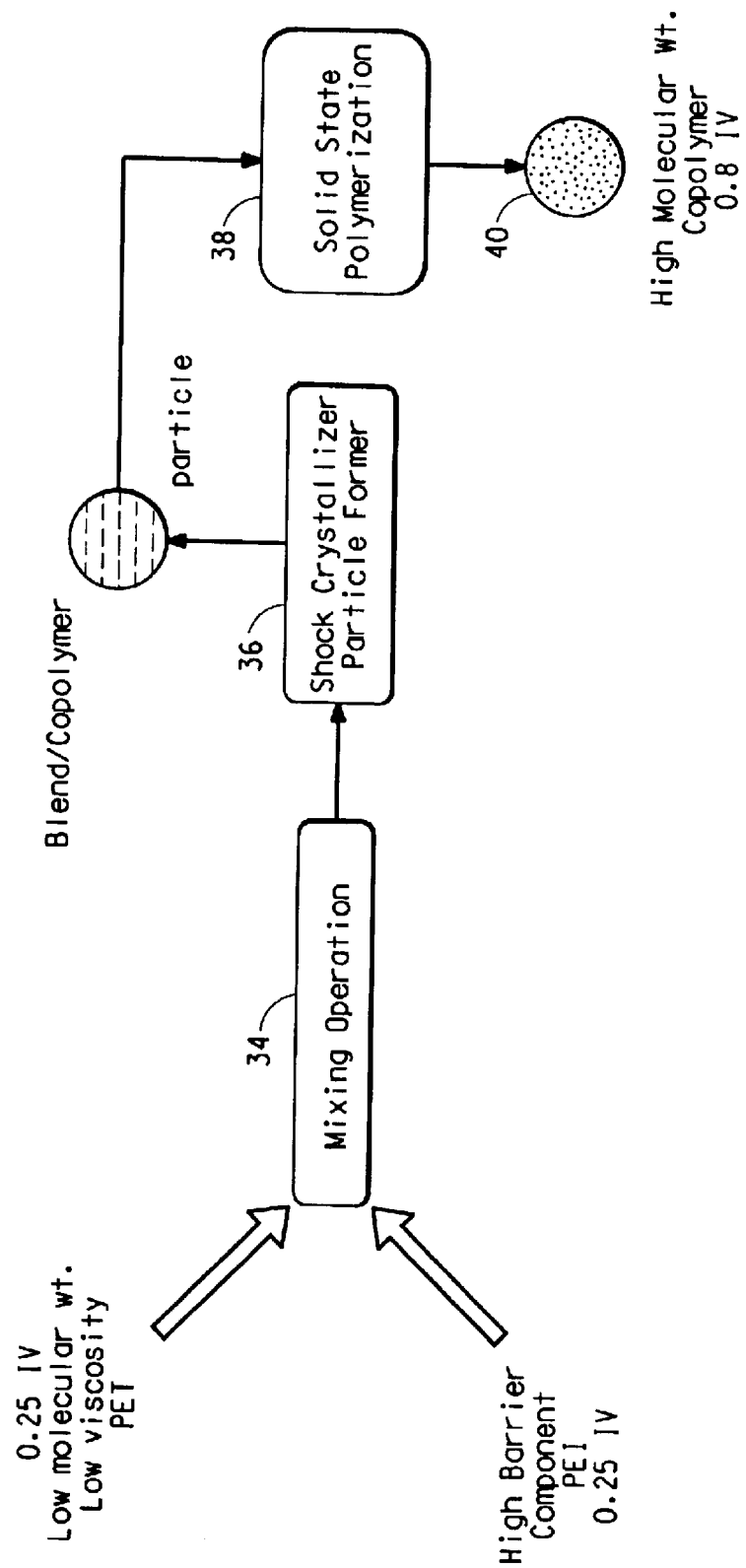
FIG. 2 is a diagram of the process of the invention.

A diagram of one embodiment of the process of the invention is illustrated in FIG. 2. In this embodiment, a crystallizable condensation homopolymer (illustrated as 0.25 IV low molecular wt., low viscosity PET) and a non-crystallizable condensation polymer (illustrated as 0.25 IV high barrier component PEI) are fed to a mixing operation (34). The mixing operation melt compounds the mixture, and the mixture is then transferred to a shock crystallizer particle former (36). The shock crystallizer particle former forms particle droplets (38) which are exposed to a thermal environment such that at least a portion of the crystallizable condensation homopolymer is crystallized. These droplets are then subjected to solid state polymerization to achieve a high molecular weight copolymer (illustrated 0.8 IV) (40).

Figure 3:
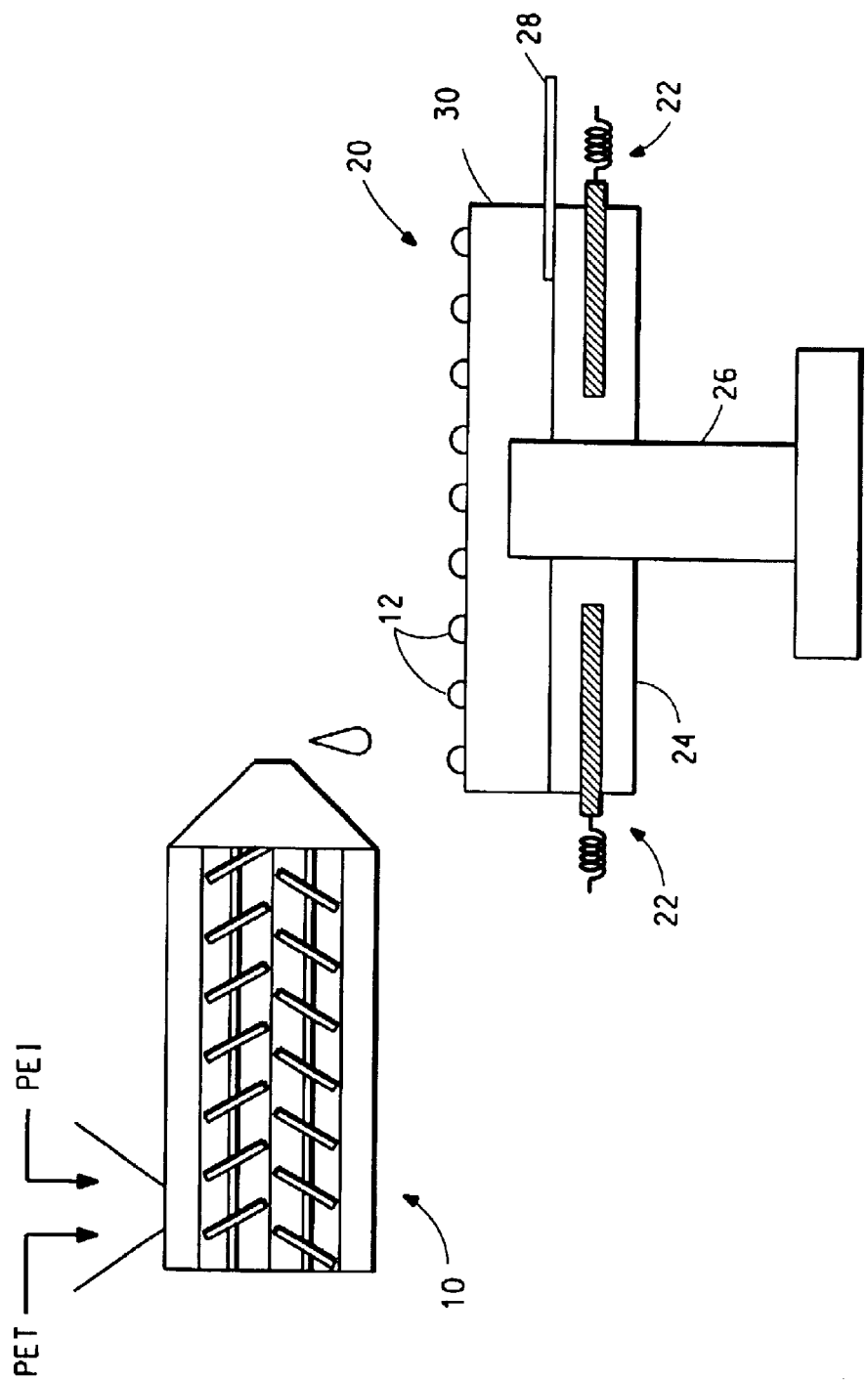
FIG. 3 illustrates an embodiment of the invention for forming solid particles from a crystallizable condensation homopolymer and a non-crystallizable condensation polymer by thermal shock crystallization, wherein a crystallizable condensation homopolymer (PET) and a non-crystallizable condensation polymer (PEI) are fed to an extruder and droplets of the extruded mixture fall to a heated rotating turntable.

An embodiment of the process steps of mixing the crystallizable condensation homopolymer and non-crystallizable condensation polymer, combining and forming molten droplets of the crystallizable condensation homopolymer and non-crystallizable condensation polymer, and exposing the droplets to a thermal environment to crystallize at least a portion of the crystallizable condensation homopolymer is illustrated in FIG. 3. In this embodiment, a crystallizable condensation homopolymer (illustrated as PET) and a non-crystallizable condensation polymer (illustrated as PEI) are fed to a twin screw extruder 10. The twin screw extruder 10 melt compounds the mixture and forms droplets 12 which are then exposed to a thermal environment on a heated rotating turntable 20 such that at least a portion of the crystallizable condensation homopolymer is crystallized. The heated rotating turntable 20 includes a cartridge heater 22, a stationary plate 24, a rotating drive 26, a thermocouple 28, and a turntable 28.

It has been discovered that, by combining and mixing in molten form a crystallizable condensation homopolymer and a non-crystallizable condensation polymer, the resulting mixture can be formed into droplets and exposed to a thermal environment to shock crystallize at least a portion of the crystallizable condensation homopolymer of the droplet. This process allows the preparation of a high molecular weight block copolymer of a crystallizable condensation homopolymer (such as PET) with greater than 10 mol % of a non-crystallizable condensation polymer (such as PEI) employing the advantageous methods of thermal shock crystallization.

The crystallizable condensation homopolymer and non-crystallizable condensation polymer each have a degree of polymerization of 10 to less than 48 prior to the step of combining. Degree of polymerization (DP) refers to the number of monomer units which are joined together to form a polymer. There are numerous methods in the art for characterizing degree of polymerization. For example, PET and PEI suitable for the practice of the present invention are characterized by intrinsic viscosities (IV) of about 0.05 dl/g to less than about 0.4 dl/g, preferably about 0.1 dl/g to less than about 0.3 dl/g. Intrinsic viscosity is determined according to the Goodyear Method R-103B. Polyamides suitable for the practice of the present invention are characterized by relative viscosities (RV) of less than about 10 preferably between 5 and 10 where RV is determined according to the method described by ASTM method D 789. In any event, the invention is applicable to low molecular weight condensation polymers suitable as precursors for high molecular weight polymers. More fundamental methods for determining molecular weight of polymers from which DP can be computed using known relations include molecular weight determinations by size exclusion chromatography, light scattering, and gel permation chromatography. All of these methods are well-known in the art.

For the purposes of the present invention, the term "crystallizable" refers to a low molecular weight condensation homopolymer (in the molecular weight range described above) which achieves a degree of crystallinity of at least 15%, preferably at least 20%, most preferably at least 30%, in a time scale of 30 seconds in a temperature range of ±10° C. around the temperature of maximum crystallization rate thereof. These levels of crystallinity correspond, respectively, for PET, to a density greater than about 1.36 g/cc, preferably greater than about 1.37 g/cc, most preferably greater than 1.39 g/cc. The amount of crystallinity can be determined by differential scanning calorimetry (DSC), as described in ASTM D3417-99, by comparing the heat of fusion of the test specimen to that of pure crystalline PET which is 140 J/g. The higher the heat of fusion in a specimen of a given polymer, the greater the degree of crystallinity. The temperature of maximum crystallization rate can be determined by cooling at 10° C./min from the melt, and observing the temperature at which the crystallization isotherm attains its peak.

For the purposes of the present invention, the term "non-crystallizable" refers to a low molecular weight condensation polymer which exhibits a degree of crystallization of no more than 5% in a time scale of 30 seconds in a temperature range of ±10° C. around the temperature of maximum crystallization of the crystallizable low molecular weight condensation polymer. Preferably, the non-crystallizable condensation polymer will exhibit no more than 1% crystallization. The non-crystallizable condensation polymer suitable for use in the present invention need not be a homopolymer. However, it is preferred that it be a homopolymer.

Suitable condensation polymers include polyamides, polyesters, polycarbonates, and polyarylates. As is well-known in the art, these polymers can be made using either aliphatic or aromatic monomers and also a mixture of monomers. The polymers are usually straight chain linear polymers. Branched homopolymers can also be used.

Illustrative examples of polyamides are poly(hexamethylene adipamide), poly(metaxylylene adipamide), poly(metaphenylene terephthalamide), poly(paraphenylene terephthalamide), poly(hexamethylene co-tere/isophthalamide), and the like. Polyamides prepared by ring opening polymerization are also suitable including nylon-6, nylon-11, nylon-12, and the like. Suitable polyesters include poly(ethylene terephthalate), poly(propylene terephthalate), poly(butylene terephthalate), poly(ethylene isophthalate), poly(ethylene naphthalate), poly(propylene naphthalate), poly(1,4-cyclohexanedimethylene terephthalate), poly(parahydroxy benzoate), and the like. Suitable polycarbonates include, for example, poly[methane bis(4-phenyl) carbonate], poly[diphenylmethane bis(4-phenyl)carbonate], poly[1,1-cyclohexane bis(4-phenyl) carbonate], and the like. Also suitable are polyarylates prepared by the condensation of aromatic dicarboxylic acids and aromatic diols, some suitable examples of which are commercially sold under the trade names EKONOL®, VECTRA®, and ZENITE®. Preferred in the practice of the present invention are PET and PEI.

Some reaction may occur between the crystallizable and non-crystallizable condensation polymers during the step of mixing the polymers in molten form. Such exchange reactions between the polymers may reduce the effective rate of crystallization and also the degree of crystallinity of the block copolymer that can be achieved in a given process. Therefore, regulation of the extent of the interchange reaction between the polymer components is a critical element to the efficacy of this process innovation. The extent of these reactions may be controlled by a number of means including regulation of the temperature or the residence time in the mixing device. The extent of the exchange reactions can be characterized by a blockiness factor. The higher the blockiness factor (B), the lower is the extent of the exchange reactions between the components of the blend. It has been found that, in order to produce robust thermal shock crystallized particles that do not stick or sinter in the solid state polymerization reactors, B should be greater than 0.8. It is preferable to have B greater than 0.9, and even more preferable to have B greater than 0.95.

The blockiness factor (B) for certain polymer blends/copolymer systems can be determined from NMR analysis. The details that follow describe the method used to measure the blockiness factors for polyethylene terephthalate (PET) and polyethylene isophthalate (PEI) blend/copolymer systems and it should be apparent that a similar technique may be used to characterize the blockiness factor for other polymer systems.

Proton NMR used to analyze the blockiness factor of the copolymers was reported by W. S. Ha et al., in *Journal of Polymer Science*: Part B: *Polymer Physics*, Volume 35 (1997), pages 309–315. When PET and PEI homopolymers are melt blended or reacted in the melt or solid phase, the resulting exchange (transesterification) reactions may lead to a copolymer containing the following eight triad species:

where I and T are the isophthalic acid-ethylene glycol units and terephthalic acid-ethylene glycol units, respectively. Note that, in a melt blend where no transesterification has taken place, one will observe only the III and TTT units. As the transesterification reactions proceed, first IIT and TTI units will be formed, which will be transformed by further exchange reactions to TIT and ITI units. Also note that, although the pair of triads (TII and IIT and TTI and ITT) are sequentially different, an analytical technique such as proton NMR cannot distinguish between the pairs. Therefore, the proton NMR can only measure the sum total of all TII and IIT units and sum total of TTI and ITT units.

Using simple algebra, the number of diad units in a copolymer can be written as follows:

$$X_{TT} = X_{TTT} + X_{TTI}$$

$$X_{TI} = X_{TTI} + X_{ITI}$$

$$X_{IT} = X_{IIT} + X_{TIT}$$

$$X_{II} = X_{III} + X_{IIT}$$

where $X_{xyz}$ represents the mole fraction of xyz triad units and $X_{xy}$ represents the mole fraction of xy diad units. Again, note that although TI and IT units are sequentially different units, they cannot be distinguished by proton NMR analysis.

By mass balance the total number of I and T units may be written as follows:

$$X_T = X_{TT} + X_{TI}$$

$$X_I = X_{II} + X_{IT}$$

The proton NMR analysis used in this work can only measure the mole fraction of III, IIT, and TIT triad units calculated on the total isophthalic acid basis. The proton NMR analysis also determines the mole fraction of I and T units. Therefore the mole fraction of diad units calculated on total isophthalic and terephthalic acid basis may be written as:

$$X_{II} = \frac{x_{III}}{\left(1 + \frac{x_T}{x_I}\right)} + \frac{x_{IIT}}{2\left(1 + \frac{x_T}{x_I}\right)}$$

$$X_{TI} = \frac{x_{TIT}}{\left(1 + \frac{x_T}{x_I}\right)} + \frac{x_{IIT}}{2\left(1 + \frac{x_T}{x_I}\right)}$$

$$X_{IT} = \frac{x_{TIT}}{\left(1 + \frac{x_T}{x_I}\right)} + \frac{x_{IIT}}{2\left(1 + \frac{x_T}{x_I}\right)}$$

Thus, $X_{II}$, $X_{IT}$ and $X_{TI}$ can be calculated by measuring $x_{III}$, $x_{IIT}$, and $x_{TIT}$, $x_T$ and $x_I$ from NMR analysis. The conditional probability of finding an I unit next to a T unit, $P_{TI}$ and the conditional probability of finding a T unit next to an I unit, $P_{IT}$, may be written as follows:

$$P_{TI} = \frac{X_{TI}}{X_T}$$

$$P_{IT} = \frac{X_{IT}}{X_I}$$

The measure of blockiness of the PEI/PET copolymer can be taken as the sum of $P_{TI}$ and $P_{IT}$ as follows:

$$B = P_{TI} + P_{IT}$$

In this invention, the resulting thermal shock crystallized particles can be solid state polymerized to form a high molecular weight block copolymer. The solid state polymerization is carried out at elevated temperatures, about 10–30° C. lower than the melting point of the crystalline phase. During the solid state polymerization, the polycondensation reactions and the exchange reactions between the polymer components lead to the formation of a high molecular weight block copolymer.

It is a requirement of the present invention that one crystallizable low molecular weight condensation homopolymer be employed as a major component at a level of at least 70 mol %, and at least one non-crystallizable low molecular weight condensation polymer be employed as a minor component at a level of more than 10 mol %. It is within the scope of the present invention to incorporate up to 20 mol % of one or more additional low molecular weight condensation polymers as additional minor components and which may be crystallizable or non-crystallizable. If two crystallizable condensation homopolymers are employed, then the thermal shock crystallization conditions must be adjusted to crystallize the major component, but may, if desired and feasible, be adjusted to crystallize both crystallizable homopolymers. The solid state polymerization conditions can also be selected such that the polymerization temperature is either lower than the melting point of both polymer components or is above the melting point of the minor polymer component but below the melting point of the major homopolymer component.

The salient feature of this invention is that a melt blend of low molecular weight polymers, consisting of up to 30 mol % non-crystallizable condensation polymer, can be thermal shock crystallized to form particles with a preferred crystalline morphology, which may then be polymerized at elevated temperatures, in the solid phase, to form block copolymers. Thermal shock crystallization involves subjecting the polymer droplets, very rapidly, to a thermal environment that allows for the maximum rate of crystallization of the crystallizable condensation homopolymer of the mixture. Keeping the polymer droplets (also referred to as pellets) in a zone of highest crystallization rates for an extended period of time ensures that the droplets will achieve the preferred crystalline morphology to support solid state polymerization of the resulting solid particles. As a result, the resulting particles can be solid state polymerized at elevated temperatures even when the particles consist of large fractions of the non-crystallizable condensation polymer. Therefore, this process allows one to synthesize semi-crystalline block copolymers in the solid state even when one of the polymer components does not crystallize or when a random copolymer of equal composition could not be solid state polymerized.

For the purposes of the present invention, the term "homopolymer" should be taken to encompass copolymers comprising less than 5 mol % of a comonomer in the polymer chain, preferably less than 3 mol %, most preferably less than 1 mol %, so long as the crystallization behavior of the "homopolymer" thus constituted remains within the parameters of the invention.

While the present invention is directed primarily to the formation of block copolymers, the scope of the present invention also encompasses the situation in which at least one minor component, for example, a polyamide, is immiscible in the major component, for example, PET. In such a circumstance, the two components will not undergo exchange reactions and will simply form a dispersion during the melt mixing step, and will separately undergo molecular weight increase during solid state polymerization. The product of the process of the invention in that circumstance will be a two phase blend of high molecular weight polymers.

The melt blending of the polymers to form the mixture for thermal shock crystallization may be carried out by any means known in the art. This includes single screw or twin screw extruders, in-line static mixers such as Koch and Kenics mixers, in-line high shear kinetic mixing devices, or any other device used to mix high viscosity liquids. Thorough mixing of the polymers in the melt is necessary to intimately disperse the minor polymer component in the major polymer component. If the major and minor polymer components are immiscible over the time duration of mixing, it is desirable that, after mixing, the dispersed phase of the minor polymer component be as small as possible, preferably, the size of the droplets in the dispersed phase is less than 100 μm, more preferably less than 10 μm, most preferably less than 1 μm. If the droplet size in the dispersed phase exceeds the preferred range, the blend/copolymer particles tend to stick in the solid state polymerization reactors. The size of the droplets in the dispersed phase may be determined by observing samples under a transmission electron microscope. Since the shape of the droplets in the dispersed phase may be irregular, the droplet size is defined by the longest dimension. The melt blending is usually done at a temperature about 15 to 50° C. higher than the melting point of the crystallizable condensation homopolymer. When a non-crystallizable condensation polymer is melt blended with the crystallizable condensation homopolymer major component, the melt blending should be done at a temperature higher than the melting point of the crystallizable homopolymer and well above the glass transition temperature of the non-crystallizable condensation polymer.

In the process of the invention, each low molecular weight condensation polymer to be included in the mixture is separately prepared according to any method known in the art. One means for producing the low molecular weight condensation polymer components involves separate melt polymerization reactors. Such reactors are well known in the art. A conventional melt polymerizer has an inlet for receiving reactants and an outlet connected to a conduit for transporting the polymer melt to the polymer mixing device. The polymer exiting the outlet is typically at or above its melting temperature. The polymer can be transferred to the mixing device by means of any pressure displacing device such as a variable speed displacement pump or melt gear pump.

Once formed, the low molecular weight condensation polymer suitable for the process of the invention may be fed to the mixing apparatus by any convenient means. According to one method, feeders supply the polymers in the form of flakes, pellets, chips, or powders. Alternatively, separate extruders can heat the low molecular weight condensation polymer components to form a melt stream to be fed to the mixing device.

In the practice of the present invention, the molten mixture of the component low molecular weight condensation polymers is formed into droplets. The droplet formation can be accomplished by adapting various methods and apparati known in the art. This can include dripping, pastillating, spray atomization, and melt cutting, among others. Any method is suitable so long as the polymers can be formed into discrete portions in the molten state.

Preferred for the formation of droplets is the process of "pastillation." A suitable pastillator comprises an outer, rotatable, cylindrical container having a plurality of orifices circumferentially spaced on its periphery, the outer cylindrical container housing coaxially within it an inner, cylindrical container having a metering bar or channel. The plurality of the orifices on the outer container are disposed such that they will cyclically align with the metering bar or channel on the inner container when the outer container is rotated. The molten polymer is transferred to the inner container of the pastillator and, under pressure, is dispensed in uniform amounts, forming droplets as each of the plurality of orifices on the outer container align with the metering bar on the inner container. Pastillators are commercially available, e.g. the ROTOFORMER™ pastillator manufactured by Sandvik Process Systems (Totowa, N.J.).

Immediately after the molten droplets are formed at the melt temperature, the droplets are caused to be deposited upon a heated surface maintained at a well controlled temperature in a range of ±10° C. with respect to the maximum crystallization temperature of the major component. The thermal shock is generally achieved through radiant, conductive, and/or convective heat. Preferably, heating is through the use of conductive or radiant heat. It is within the scope of the present invention to expose the crystallizing droplets to more than one means of heat transfer at a time in order to achieve one or another particular heating profile as may be desired in any particular embodiment of the present invention. Thus, heating may be effected by combining conductive heat transfer from a heated belt with convective heat transfer using a purge gas such as nitrogen. Other gases as well as liquids may be employed as heat transfer media.

When forming a substantially-crystalline particle from an essentially-amorphous melt, the process comprises forming the molten droplets of the polymer mixture at a temperature $T_1$, wherein $T_1$ is at least the melting point $T_m$ of the major component of the mixture, and wherein the major component has a degree of polymerization (DP) of 2 to 48, preferably 10–40, most preferably 15–35, and a glass transition temperature ($T_g$) above 25° C. Preferably, $T_1$ is between $T_m$ and $T_m+30°$ C., most preferably between $T_m$ and $T_m+10°$ C. If a non-crystallizable condensation polymer is used as the minor component in the melt blend, then $T_1$ is much higher than the glass transition temperature of the polymer $T_g$, preferably $T_1=T_g+50°$ C.

In one embodiment of the thermal shock crystallization process, the molten droplets are placed in contact, for at least 3 seconds, with a solid surface which is at a temperature within the range of $T_{min}$ to $T_{max}$ as defined below, whereby the droplets sustain rapid change in temperature towards the said target temperature and remain at a temperature within said range of the target temperature for a sufficient period of time. In this embodiment of the thermal shock-crystallization process, preferably, the solid surface is metallic, since metallic solid surfaces provide good heat transfer and, hence, bring the particles to the desired temperature most rapidly. The surface is also preferably moving in a continuous process, as can be obtained, for example, with a conveyor belt.

In the present invention, $T_{min}=T_g+10°$ C. and $T_{max}=T_c+0.5(T_m-T_c)$, wherein $T_c$ is defined as $T_c=T_g+1/2(T_m-T_g)$. However, if the solid surface has a heat transfer coefficient (hs) which is below 1.5 joules/sec.cm.° C., then $T_{min}$ may be between 0° C. and $T_g+10°$ C., provided that the bulk average temperature of the droplets remains above $T_{min}$ for at least 3 seconds after the droplets contact the solid surface and provided that the bulk average temperature of the droplets reaches $T_{max}$ within 15 seconds after the droplets contact the solid surface. Preferably, $T_{max}=T_c+0.3(T_m-T_c)$ and, most preferably, $T_{max}$ is about $T_c+10°$ C. Preferably, at least for metallic surfaces such as steel or aluminum, $T_{min}=T_c-0.5(T_c-T_g)$, more preferably $T_{min}=T_c-0.3(T_c-T_g)$, most preferably $T_m=T_c-10°$ C.

Preferably, the particles formed by thermal shock crystallization are exposed to the surface in the indicated temperature range for at least 3 seconds, more preferably at least 10 seconds, most preferably at least 20 seconds. There is no time limit for how long the particles are exposed to the surface in the indicated temperature range; for practical purposes it should be kept as short as possible, and in any event less than 3 minutes. For example, in an integrated solid state polymerization (SSP) plant for making high molecular weight block copolymers, the particles after being formed may be introduced into the SSP reactor within 10 minutes after the particles are formed. It is also possible to store the particles at room temperature for later use.

In an integrated process for producing high molecular weight block copolymers, the low molecular weight shock crystallized particles are further polymerized in SSP reactors into high molecular weight polymers. Solid state polymerization is well known to the artisan. See for instance, F. Pilati in G. Allen, et al., Rd., *Comprehensive Polymer Science*, Vol. 5, p 201–216 (Pergamon Press, Oxford 1989). Solid state polymerization is particularly useful in making high molecular weight polymers. In general, particles made by the thermal shock crystallization process of the present invention are heated to a temperature below the melting point of the major component and a dry gas, usually nitrogen, is passed, usually counter-currently in continuous operation, around and over the particles. At the elevated temperature of the solid state polymerizer, exchange reactions and polycondensation reactions proceed, and the gas can be used to carry away the volatile products, thereby driving the molecular weight higher. Other methods, such as applying a vacuum, may also be used for this purpose.

EXAMPLES

In the following specific embodiments, the focus is on the preferred embodiment of the present invention, namely a process for preparing block copolymers of PET and PEI. However, one of skill in the art will appreciate that the crystallization phenomena which govern the operability of the process as described are not confined to PET and PEI but are rather general phenomena which depend more on the propensity of the given materials to form crystals than on the specific chemical identity of the species. Thus, the present invention is equally applicable to any combination of a crystallizable major component and a non-crystallizable minor component. Thus, it is clear to one of skill in the art that with little modification the practice of the invention as described for PET and PEI can be applied to other crystallizable condensation homopolymers in place of PET including polyesters such as polypropylene terephthalate, polybutylene terephthalate, and polyethylene naphthalate; polyamides such as polyhexamethylene diamine, polycaprolactone and other rapidly crystallizing polymers. In similar fashion, it is clear to one of skill in the art that with little modification the practice of the invention as described for PET and PEI can be applied to other non-crystallizable condensation polymers in place of PEI such as polycarbonates or polyarylates.

In the examples reported, the intrinsic viscosity of the polymer samples was measured by the Goodyear Method R-103B. The polymer solvent was prepared by mixing one volume of trifluoroacetic acid and 1 volume of dichloromethane. Next, 0.10 g of polymer was added to a clean dry vial and 10 mL of the prepared solvent mixture was added using a volumetric pipette. The vial was sealed and shaken for 2 hrs or until the polymer dissolved. The solution so prepared was forced through a flow-through capillary rheometer, Viscotek Y900. The temperature for the viscosity measurement was fixed at 190° C.

Thermal analysis of polymer samples was performed on TA Instruments differential scanning calorimeter (DSC). About 5 mg of a polymer sample was weighed and then sealed in a DSC sample pan. The sample pan was loaded onto the DSC heat chamber. The sample was heated from room temperature to 300° C. at a constant rate of 10° C./minute. The melting point was noted as the peak of the melting endotherm. The heat of fusion was determined by integrating the total area under the endotherm peak.

The isothermal crystallization rate was determined on a Perkin Elmer DSC. Crystallization from the melt was determined as follows: about 10 mg of the polymer sample was heated from 30° C. to 290° C. at a rate of 200° C./minute, held at 290° C. for 3 minutes, then rapidly cooled at the rate of 200° C./minute to the desired temperature of crystallization and held at the temperature for 15–60 minutes until there was no further evidence of ongoing crystallization as indicated by the termination of the exothermic process. Crystallization from the glassy state was determined as follows: polymer was rapidly heated to 290° C. on a hot plate, held at that temperature for 5 minutes and then immediately quenched in liquid nitrogen. The quenched sample was then transferred to the DSC where it was rapidly heated at 200° C./minute to the crystallization temperature and held at the temperature until there was no further evidence of ongoing crystallization as indicated by the termination of the exothermic process. At any given temperature, the time that the sample takes to crystallize to 50% of the final crystallinity was characterized as the half time of crystallization. The inverse of the half time was used as a measure of the rate of crystallization. Hence, the lower the half time for crystallization the higher the crystallization rate.

Example 1

Shock Crystallization of a PET/PEI Blend on a Turn-table

Polyethylene terephthalate prepolymer with an approximate IV of 0.20 dl/g was produced on a 100 lb/hr continuous pilot plant facility. A 2:1 molar ratio of ethylene glycol to terephthalic acid was fed to a slurry mix tank. The glycol acid slurry was then fed to a recirculating esterifier. The operating temperature in the esterifier ranged between 280° C. and 290° C. and the operating pressure was held at 1 atm. The approximate residence time in the esterifier was 1 hr. The low molecular weight ester or oligomer drawn from the esterifier had an approximate degree of polymerization of 7 and the acid end concentration was about 800 meq/Kg. The degree of polymerization was estimated from gel permeation chromatography and intrinsic viscosity measurement. The acid ends in the ester were determined from acid base titration.

The resulting ester was then fed to a high pressure pipeline reactor as described in U.S. Pat. No. 5,811,496. The pressure in the pipeline reactor was controlled at 1.1 MPa. A catalyst solution of antimony glycolate in ethylene glycol was injected into the pipeline reactor such that the final concentration of antimony in the polymer was 275 ppm. The resulting oligomer was further melt polymerized in a countercurrent staged column reactor, a process which is described by U.S. Pat. No. 5,786,443. The pressure in the reactor was held at 1 atm pressure and the operating temperature ranged between 280° C. and 290° C. The residence time of the polymer in the reactor and the flow rate of inert gas were used to control the final molecular weight of the prepolymer exiting the column reactor. The prepolymer melt was then pelletized and shock crystallized on a moving steel belt of a rotoformer. The temperature of the belt was kept between 120° C. and 130° C. The process of thermal shock crystallization and the equipment used are described in U.S. Pat. Nos. 5,540,868 and 5,633,018, respectively.

Low molecular weight PEI homopolymer was also prepared on the above described 100 lb/hr scale process equipment. A slurry of pure isophthalic acid (no terephthalic acid added to the slurry tank) in ethylene glycol, where the ratio of glycol to acid ratio was 2.0, was fed to the esterifier. The esterifier was operated at atmospheric pressure and in a temperature range of 280° C. to 290° C. The resulting PEI ester was fed to the high pressure pipeline reactor. A solution of antimony glycolate in ethylene glycol was injected into the pipeline reactor. The PEI ester was further polymerized in the column reactor and the resulting molten prepolymer was pelletized by the rotoformer and quenched on the moving steel belt. Since PEI is inherently amorphous and does not crystallize, the rotoformer belt was not heated during the pelletization process. Due to the heat transfer of the hot PEI melt to the unheated belt, the steady state temperature of the belt was approximately 40° C. The antimony concentration in the PEI prepolymer was approximately 275 ppm and its IV was 0.3 dl/g. The COOH ends concentration was determined to be 90 Eq/$10^6$ g.

The PET batch had an average IV of 0.23 dl/g while the PEI batch had an IV of 0.26 dl/g. Both polymers were ground to a 20 mesh powder using a Thomas bench top grinder and then dry blended in a batch mixer in four different proportions such that the nominal PEI concentration in the four dry samples was, 5 wt %, 10 wt %, 15 wt % and 20 wt %, respectively.

Each low molecular weight polymer mixture was then melt compounded in a 18 mm twin screw Prism extruder, melt cut, and the resulting molten droplets were shock crystallized on a heated rotating turntable as described below. The final concentration of PEI in the four samples was 4.3 mol %, 9.1 mol %, 13.2 mol % and 18.3 mol %, respectively. The melt compounding in the extruder was carried out at the following temperature conditions:

| Zone 1 | Zone 2 | Zone 3 | Extrusion Die |
| --- | --- | --- | --- |
| 174° C. | 240° C. | 255° C. | 275° C. |

The screw speed was set at 50 rpm. Each sample was fed to the extruder at the rate of 100 g/hr. The polymer melt extruded through a 1.0 mm die forming individual droplets that fell about 5 cm through room temperature air onto a heated turntable. The turntable provided precise regulation of surface temperature and residence time on the heated surface with continuous particle formation from the extruder. The turntable device consisted of a rotary actuator driven by a stepping motor, a rotating stainless steel turntable in contact with a stationary heated plate. The temperature of the turntable was controlled through manipulation of the temperature of the stationary plate. A calibration curve was generated for the controlled measured temperature of the stationary plate versus the surface temperature of the turntable. After about 300 degrees of rotation on the turntable the crystallized particles hit a metal blade which knocked them off the turntable and into a room temperature collection pail.

The temperature of the turntable was initially maintained at 120° C. and was varied to ensure the crystallization of the samples. The residence time of the particles on the turntable was initially fixed at 60 seconds and was varied to ensure the crystallization of all samples. The samples containing 5, 10 and 15 wt % PEI crystallized easily at a turntable temperature of 120° C. and at a residence time of 60 seconds. The 20 wt % PEI/PET sample required 140° C. and a residence time of 90 seconds.

The molten polymer drops were transparent when they fell on the heated belt. As the drops began to crystallize, they turned transparent to translucent and eventually turned opaque. Crystallization provided strength and hardness to the final polymer particle, which when sufficiently crystallized easily snapped off the heated surface. When sufficient crystallization was not achieved on the belt the particles were translucent and shiny on the surface, were soft and gummy, and could not be easily removed from the heated surface.

Table 1.1 provides the mol % PEI, peaking melting point, heat of fusion, and blockiness factor of the Example 1 samples.

TABLE 1.1

| Sample | mol % PEI | Peak melting point ° C. | Heat of fusion J/g | Blockiness factor |
| --- | --- | --- | --- | --- |
| E98093-105E | 4.3% | | | 0.72 |
| E98093-105H | 9.1% | 251 | 40.5 | 0.64 |
| E98093-105K | 13.2% | 249 | 40.5 | 0.61 |
| E98093-105N† | 18.3% | 237 | 38.9 | 0.49 |

†Sample crystallized at 140° C. with a residence time of 90 seconds.

As may be inferred from the small blockiness factors in Table 1.1, the samples underwent considerable transesterification in the prism extruder. This may explain the slow rate of crystallization of the 18.3 mol % PEI sample. On a commercial scale, it is desirable that the transesterification level of the copolymer be minimized such that the blockiness factor is greater than 0.9.

Comparative Example 1

Shock Crystallization of Random PET/I Copolymers on Turntable

Low molecular weight random polymer samples were prepared in a 500 ml glass batch reactor. A 500 ml round bottom flask was charged with a known amount of polyethylene terephthalate homopolymer prepared from the reaction between ethylene glycol and terephthalic acid. The degree of polymerization of the homopolymer, which was determined by gel permeation chromatography and intrinsic viscosity measurement, was approximately 6. To the same flask was added a measured amount of isophthalic acid. The flask was immersed in a molten metal bath at a temperature of 270° C. The reaction vessel was continuously purged with dry nitrogen gas. After the solid polymer mixture had melted to a liquid, a measured amount of a catalyst solution of antimony glycolate and ethylene glycol was added to the flask. The amount of catalyst added was predetermined to ensure that the concentration of antimony in the polymer was approximately 250 ppm by weight. Isophthalic acid has a very low solubility in the PET ester and, therefore, initially gave rise to a milky white solution. As the esterification reaction proceeded, the level of the almost insoluble IPA depleted, giving rise to a translucent melt which eventually turned colorless and transparent. The molten mixture in the flask was stirred until all the isophthalic acid had reacted and the molten liquid was clear. At this point the temperature of the metal bath was increased to 290° C. and the reactor was subjected to a vacuum of at least 0.5 mm Hg. The molten liquid in the reaction vessel was vigorously stirred. The vigorous movement in the reactor created a large vapor liquid interfacial area, which enhanced mass transfer rate and reaction rates. The introduction of vacuum to the reactor allowed ethylene glycol and water to be drawn out of the reactor thereby causing the polycondensation and transesterification reactions to proceed. The polymerization was allowed to progress for varying times ranging between 20 and 45 minutes, after which point nitrogen was reintroduced into the reactor and the molten content of the reactor was dumped into a metal pan.

Random copolyesters containing 4.8 mol % IPA, 9.7 mol % IPA, 15.7 mol % (IPA), and 19.4 mol % IPA were made for studying the crystallization rate of the polymers. The IPA composition in the copolyesters was evaluated from the analysis of the proton NMR spectrum of the copolymers:

| IPA from NMR | 4.8 mol % | 9.7 mol % | 15.7 mol % | 19.4 mol % |
|---|---|---|---|---|
| IV (dl/g) | 0.238 | 0.252 | 0.216 | 0.203 |

Each polymer sample was first ground into (20 mesh) powder and then extruded and pelletized on a heated turntable using the same procedure as described in Example 1. During the extrusion process, the temperatures in different zones of the extruder were as follows:

| Zone 1 | Zone 2 | Zone 3 | Extrusion Die |
|---|---|---|---|
| 175° C. | 240° C. | 255° C. | 275° C. |

Only the random copolymer containing 5% isophthalic acid crystallized with ease. Copolymer sample containing 10% isophthalic acid would only crystallize when the residence time was increased to 120 seconds and turntable temperature was increased to 150° C. The random copolymers containing 15.7% and 19.4% isophthalic acid could not be made to crystallize on the turntable over a temperature range of 120° C. to 180° C. and within a residence time of 120 seconds. Because of poor crystallization in both samples, the discrete polymer melt drops on the turntable did not form solid pellets and hence could not be easily removed from the hot surface. This comparative example shows that random copolymers of PET/I where the concentration of isophthalic acid was greater than 10% cannot be shock crystallized. Table 2.1 provides the mol % I, peak melting point, heat of fusion, and blockiness factor of the Comparative Example 1 samples.

TABLE 2.1

| Sample | mol % I | Peak melting point ° C. | Heat of fusion J/g | Blockiness factor |
|---|---|---|---|---|
| E98093-79 | 4.8% | 247 | 41.9 | 0 |
| E98093-84 | 9.7% | 235 | 34.4 | 0 |
| E98093-85 | 15.7% | — | — | 0 |
| E98093-86 | 19.4% | — | — | 0 |

Example 2

Linear and Branched PET/PEI Copolymers Made Using 57 mm Twin Screw Extruder and a ROTOFORMER®

A linear PET/PEI copolymer was prepared as follows. PET with an IV of 0.20 dl/g and COOH ends of 215 Eq/$10^6$ g and containing approximately 275 ppm antimony as a polymerization catalyst was prepared by the melt phase polymerization process as described in Example 1. Low molecular weight PEI with an IV of 0.30 dl/g and COOH ends of 90 Eq/$10^6$ g, was prepared by a process that has also been described in Example 1. The PEI prepolymer contained approximately 275 ppm of antimony catalyst. The PET prepolymer pellets were fed using a K-Tron weight loss feeder and the PEI prepolymer pellets were fed using a K-Tron volumetric feeder, at a feed composition of 18% PEI by weight in the blend, straight into the feed zone of the extruder. The melt blend was processed at 300 rpm screw speed through a Werner and Pfleiderer 57 mm co-rotating twin screw extruder with five heated zones:

| Zone 1 | Zone 2 | Zone 3 | Die | Adapter |
|---|---|---|---|---|
| 100° C. | 160° C. | 260° C. | 290° C. | 290° C. |

The feed zone and the first heated zone were cooled using a chiller operating at −10° C. The molten polymer material was pumped under pressure at a flow rate of 50 lbs/hr into a 14.5 cm wide ROTOFORMER® dropformer manufactured by Sandvik Process Systems, Totowa, N.J. The orifices, aligned in rows along the ROTOFORMER®, were 2.0 mm in diameter. The feed temperature of the molten polymer material was about 285° C. at the entry of the ROTOFORMER®. The molten polymer material was fed in the form of droplets onto a steel conveyor 12 ft in length, which was also manufactured by the Sandvik Process Systems. The speed of the moving belt was such that the residence time of the polymer pellets on the belt was approximately 45 seconds. The steel belt was heated to 120° C. using two sources, a heated roll near the particle former and an electric convection oven downstream of the pellet former and immediately after the roller. The molten polymer droplets solidified on the belt to uniform, hemispherical particles, which were conveyed to a collection bin.

Example 3

A branched PET/PEI copolymer was prepared as follows. Branched PET with an IV of 0.240 dl/g and COOH ends of 171 Eq/$10^6$ g and containing approximately 300 ppm of antimony catalyst was prepared by the same melt phase polymerization process described in Example 1. In order to introduce chain branching into the polymer, 0.1 mol % of pyromelletic acid was injected into the pipeline reactor. PEI having an IV of 0.3 d/g and carboxyl ends of 90 Eq/$10^6$ g was prepared by the same process and containing approximately the same amount of antimony catalyst was used. A melt blend of PET/16 wt. % PEI composition was made using the same conditions as used for the linear PET/PEI blend.

For both the linear and branched PET/PEI copolymers, the resulting pellets did not stick to the belt—both polymer particles came off the belt with ease. The particles also did not stick to each other. Thermal analysis of the linear and branched shock crystallized samples did not show an exothermic crystallization peak, indicating that crystallization was essentially complete during shock crystallization. Table 3.1 provides the type of PET, mol % PEI, peaking melting point, heat of fusion, and blockiness factor of the Example 2 samples.

TABLE 3.1

| Sample | PET | mol % PEI | Peak melting point ° C. | Heat of fusion J/g | Blockiness factor |
|---|---|---|---|---|---|
| Example 2 | Linear | 18% | 253 | 44.0 | 0.94 |
| Example 3 | 0.1% Branched | 16% | 254 | 43.5 | 1.00 |

Comparative Example 2, and Example 4
Crystallization Rates of Low Molecular Weight PET Homopolymer, PET/I Random Copolymers, and PET/PEI Copolymers Crystallization half times (as a function of temperature) of low molecular weight PET homopolymer, PET/I random copolymers of Comparative Example 1 and PET/PEI copolymers of Examples 1–3 were measured on a Perkin Elmer DSC. Also measured were the crystallization half times of dry blends of low molecular weight PET and PEI prepolymer.

The transesterification between PET and PEI depends on the melt residence time used in making the copolymers. Because the PET/PEI copolyesters of Examples 1–3 have reacted to a very limited extent during their preparation, they can still undergo some amount of transesterification when subjected to a DSC experiment. Therefore, the crystallization rate measured in a DSC does not correspond to the "as made" copolymer, but to that of copolymers transesterified to a higher degree than the "as made" copolymers. Note that the random copolymers of Comparative Example 1 have undergone complete transesterification and therefore their crystallization rates should not be affected by the DSC experiment.

To discern this effect, an isothermal crystallization study was carried out with copolymers made using three different methods. The first method included the PET/20% PEI copolymer of Example 1 in which the copolymer stayed under the melt condition approximately for about five minutes. The second method included powders of PET and PEI prepolymers that were mixed in an appropriate weight ratio for the DSC analysis. The polymers were cryo-ground to reduce the particle size to less than 50 micron for good mixing of the phases in the melt. However, this mixing was not as thorough as the mixing obtained using an extruder. The "as made" copolymers made using Comparative Example 1 showed the PEI phase in the range 0.15 to 0.30 micron size. The third method included the PET/20% PEI copolymer of Examples 2 and 3 using linear and branched PET in which the copolymer stayed under the melt condition for less than a minute. The resulting crystallization and melting points of the polymers are provided in Table 4.1.

TABLE 4.1

| Polyester composition | Tc heating (° C.) | Tc cooling (° C.) | Tm (° C.) | Heat of fusion* (J/g) |
|---|---|---|---|---|
| PET homopolymer | 124.0 | 210.6 | 248.6 | 54.66 |
| PET/4.7% IPA random copolyester | 134.5 | 191.6 | 244.7 | 49.65 |
| PET/9.7% IPA random copolyester | 139.4 | 171.5 | 233.7 | 49.61 |
| PET/15.7% IPA random copolyester | 145.0 | 150.9 | 219.8 | 39.14 |
| PET/19.4% IPA random copolyester | 155.4 | 134.7 | 207.5 | 21.49 |
| PET/5% PEI powder blend | 125.3 | 201.4 | 244.5 | 58.98 |
| PET/10% PEI powder blend | 126.7 | 194.4 | 242.3 | 55.15 |
| PET/15% PEI powder blend | 125.4 | 185.8 | 244.6 | 53.63 |
| PET/20% PEI powder blend | 130.1 | 180.5 | 236.6 | 43.87 |
| PET/19.4% PEI made using Prism extruder and turn-table | 132.2 | 164.9 | 228.7 | 44.20 |
| PET/18% PEI made using Rotoformer | 129.1 | 190.0 | 237.4 | 49.44 |
| Branched PET/16% PEI made using Rotoformer | 128.2 | 196.0 | 242.6 | 50.82 |

*The heat of fusion corresponds to the melt peak in a reheat cycle of the copolymers quenched from the melt.

Figure 4:
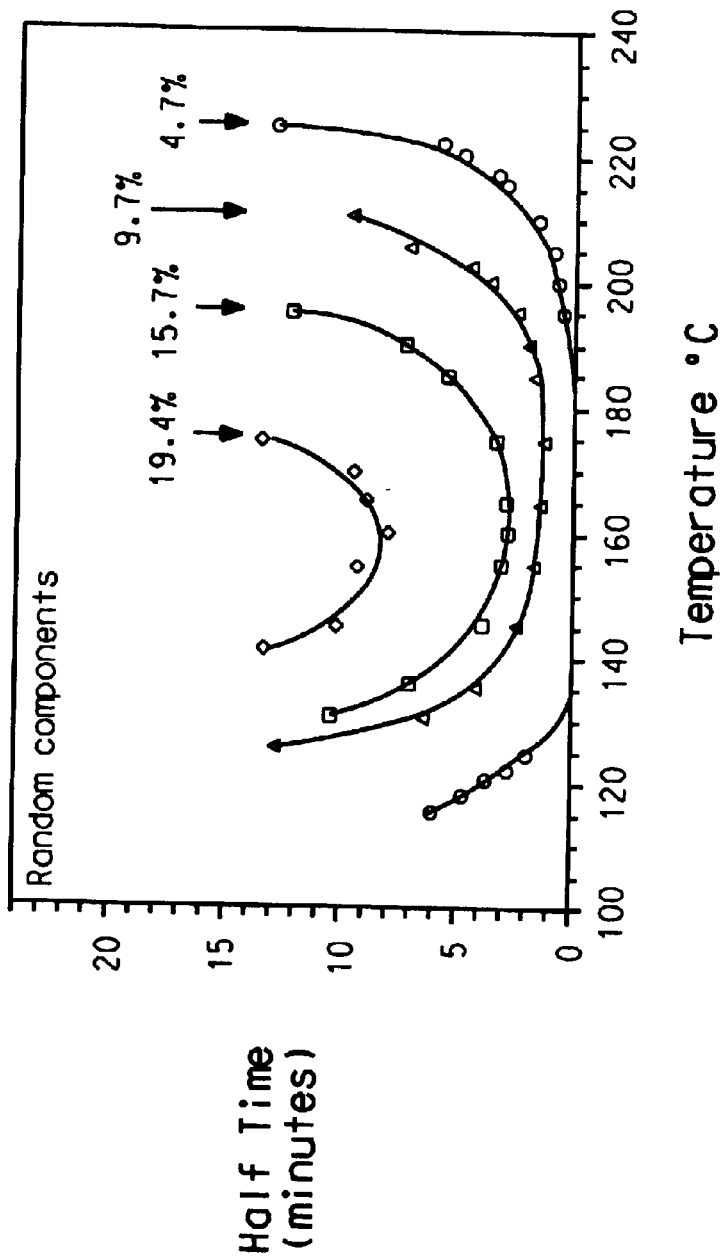
FIG. 4 shows the crystallization half times of I/T random copolymers with varying concentrations of I.
Figure 5:
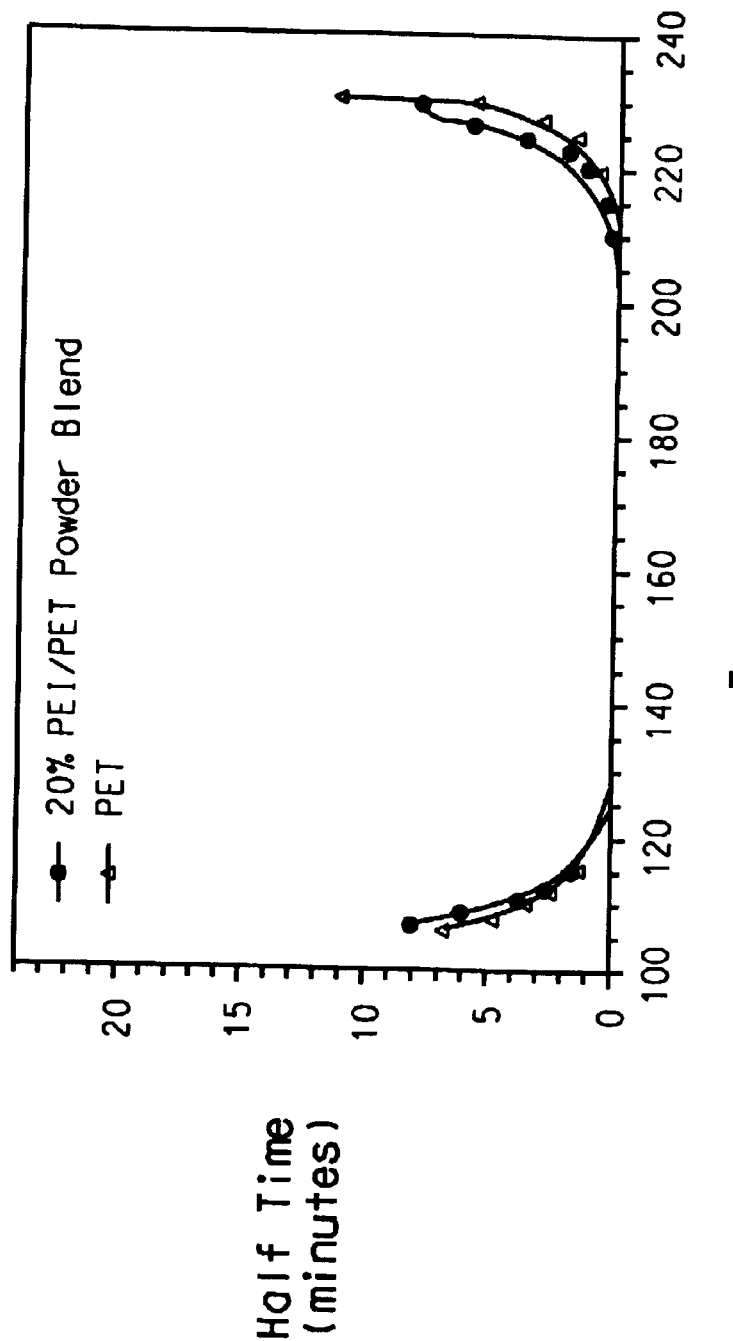
FIG. 5 shows the crystallization half times of 20% PEI/PET powder blend and PET.
Figure 6:
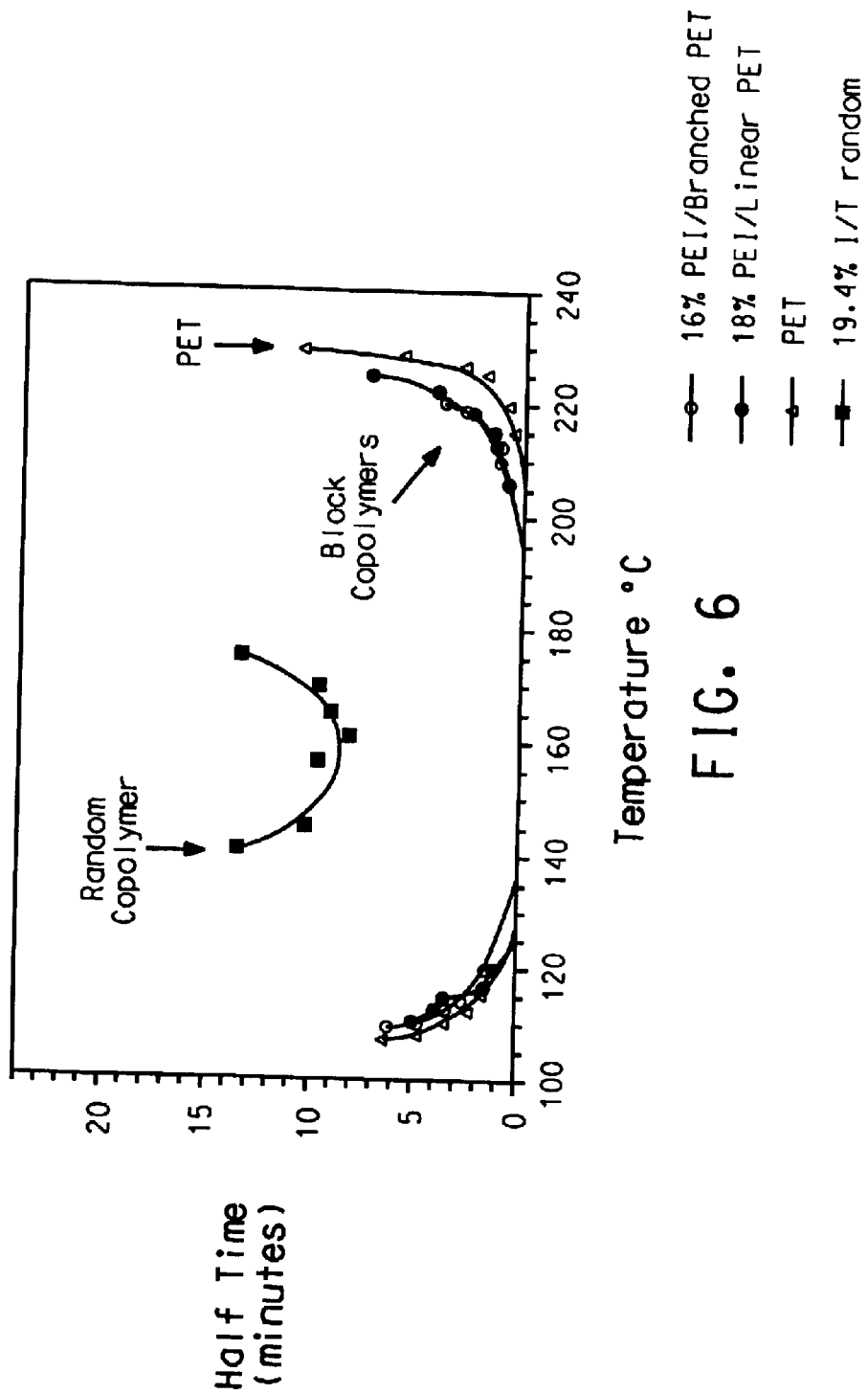
FIG. 6 shows the crystallization half times of PEI/PET block copolymers, a 19% random copolymer, and PET.

The measure of crystallization rates of the copolymers (plot of isothermal crystallization half time against temperature) are provided in FIG. 4 (PET/I random copolymers), FIG. 5 (PET/PEI powder blend), and FIG. 6 (PET/20% PEI copolymers). Generally, the random and PET/PEI copolymers have a slower crystallization behavior than the PET homopolymer. Among the copolymers, the random copolymer has a slower crystallization rate than a corresponding PET/PEI copolymer containing the same amount of isophthalic acid. The crystallization rate of the PET/20% PEI copolymers illustrated in FIG. 4 shows clearly the relationship between the transesterification of the copolymer and the crystallite size. As illustrated in FIG. 6, the Examples 2 and 3 copolymers showed a higher crystallization rate, which was not substantially different from the crystallization behavior of PET homopolymer.

Although illustrated and described above with reference to specific embodiments, the present invention is nevertheless not intended to be limited to the details shown. Rather, various modifications may be made in the details within the scope and range of equivalents of the claims and without departing from the spirit of the invention.

What is claimed is:

1. A process for forming solid particles, comprising:
    a) combining in molten form a major component of a crystallizable condensation homopolymer and a minor component of a non-crystallizable condensation polymer, wherein said crystallizable condensation homopolymer and said non-crysatallizable condensation polymer each have a degree of polymerization of 2 to less than 48 prior to said combining;
    b) mixing said combined crystallizable condensation homopolymer and non-crystallizable condensation polymer in molten form to form a mixture, said mixture comprising 10 to 30 mol % of said non-crystallizable condensation polymer;
    c) forming said mixture into droplets; exposing said droplets to a thermal environment which results in the bulk of the droplet reaching within 15 seconds a temperature within ±10° C. of the temperature at which the maximum rate of crystallization of said crystallizable condensation homopolymer occurs; and
    d) crystallizing at least a portion of said crystallizable condensation homopolymer in said mixture to form solid particles.

2. The process of claim 1 wherein said mixture comprises 15 to 25 mol % of said non-crystallizable condensation polymer.

3. The process of claim 1 wherein at least one of said crystallizable condensation homopolymer and said non-crystallizable condensation polymer has a degree of polymerization of 10 to 40.

4. The process of claim 1 wherein at least one of said crystallizable condensation homopolymer and said non-crystallizable condensation polymer has a degree of polymerization of 15 to 35.

5. The process of claim 1 wherein said mixture has a blockiness factor of at least 0.8.

6. The process of claim 5 wherein said blockiness factor is at least 0.9.

7. The process of claim 5 wherein said blockiness factor is at least 0.95.

8. The process of claim 1 wherein said crystallizable condensation homopolymer is polyethylene terephthalate.

9. The process of claim 1 wherein said non-crystallizable condensation polymer is polyethylene isophthalate.

10. The process of claim 1 wherein said mixture further comprises up to 20 mol % of one or more additional crystallizable or non-crystallizable condensation polymers.

11. The process of claim 1 wherein at least one polymer in said minor component of said mixture is not soluble in said major component.

12. The process of claim 10 wherein at least one polymer in said minor component of said mixture is not soluble in said major component.

13. The process of claim 1 further comprising solid state polymerizing said solid particles.

* * * * *